Patented June 21, 1938

2,121,226

UNITED STATES PATENT OFFICE 2,121,226

ETHYLENE GLYCOL DI-(HALO-ARYLOXY-ACETATES)

Ernest F. Grether, William R. Shawver, and Russell B. Du Vall, Midland, Mich., assignors to The Dow Chemical Company, Midland, Mich., a corporation of Michigan No Drawing. Application May 8, 1936, Serial No. 78,662

6 Claims. (Cl. 260—103)

This invention concerns new halo-aryloxy-acetic acid esters of ethylene glycol having the general formula

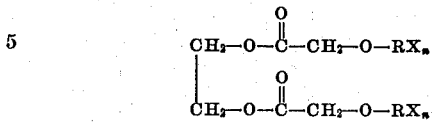

wherein R represents an aromatic group of the benzene series, X represents halogen, and $n$ is an integer not greater than 3. The term "aromatic group of the benzene series" is intended to include groups such as the phenyl, methyl-phenyl, di-methyl-phenyl, iso-propyl-phenyl, tertiary - butyl-phenyl, secondary-amyl-phenyl, diphenyl, etc.

These ethylene glycol di-(halo-aryloxy-acetates) are, in most instances, white crystalline compounds which are unusually stable against hydrolysis, decomposition by heat, and discoloration by light; and are useful as plasticizers for cellulose ethers, cellulose esters, and synthetic resins. The invention, then, consists in the new compounds hereinafter fully described and particularly pointed out in the claims.

The new ethylene glycol di-(halo-aryloxy-acetates) may be prepared by heating a mixture of a halo-aryloxy-acetic acid and ethylene glycol at a pressure not greatly exceeding atmospheric, to a temperature at which reaction occurs, and thereafter separating the ester product from the reacted mixture, e. g. by fractional distillation, crystallization, etc. The halo-aryloxy-acetic acid and ethylene glycol may be employed in any desired proportions, but the di-(halo-aryloxy-acetate) products usually result in an optimum yield when approximately two molecular equivalents of the halo-aryloxy-acetic acid are employed per mole of ethylene glycol. The reaction proceeds most smoothly and rapidly at temperatures between 100° and 180° C., but may be carried out at lower or higher temperatures, if desired. During the heating operation water vapor is evolved by the reaction mixture and is removed from the reaction zone. For convenience the reaction is usually carried out at atmospheric pressure or slightly above, e. g. at a pressure not exceeding 10 pounds per square inch; but it may advantageously be carried out under vacuum for the purpose of facilitating the distillation of water from the mixture and thereby promoting more rapid and complete reaction. Ordinarily the reaction is substantially complete after from 1½ to 10 hours of heating under the conditions just described.

If desired, a catalyst such as an inorganic acid, e. g. sulphuric acid; acid salt, e. g. sodium acid sulphate; benzene sulphonic acid, etc., may be employed in the above method to promote rapid reaction at relatively low temperatures, but the reaction proceeds smoothly and rapidly in the absence of such catalysts under the conditions described above.

The following examples describe certain of our new ester products and their preparation, but are not to be construed as limiting the invention. Each of the halo-aryloxy-acetic acids used as reactants in the example was prepared by refluxing a mixture of an alkali halo-phenate, sodium chloroacetate, and water; and thereafter separating the halo-aryloxy-acetic acid product from the reaction mixture.

Example 1

A mixture of 74.6 grams (0.4 mol.) of 2-chloro-phenoxy-acetic acid and 12.4 grams (0.2 mol.) of ethylene glycol was heated at temperatures gradually increasing from 120° to 165° C. Water was distilled off as formed during the reaction, and the amounts thereof measured from time to time to determine the extent of reaction. The mixture was heated in such manner for approximately 8 hours, i. e. until water vapor was no longer evolved, at the close of which time the quantity of water collected indicated that the reaction was 90 per cent complete. The reacted mixture was poured with stirring into 200 cubic centimeters of 95 per cent ethyl alcohol, whereby the ester product was precipitated. The precipitate was separated by filtration, washed with cold ethyl alcohol, and air dried. 72 grams (0.181 mol.) of ethylene glycol di-(2-chloro-phenoxy-acetate) was thereby obtained as a white crystalline solid melting at 107° C. This product is soluble in benzene, slightly soluble in ethyl alcohol, insoluble in water, and has the formula

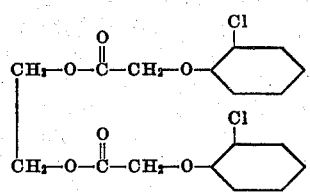

Example 2

A mixture of 187 grams (1.0 mol.) of 4-chloro-phenoxy-acetic acid, melting point 158° C., 75 grams (1.2 mol.) of ethylene glycol, and 2 grams of benzene sulphonic acid was heated at temperatures gradually increasing from 120° to about 155° C. for 3½ hours, water being distilled continuously from the mixture during said period of heating. The ester product was then separated from the reaction mixture as in Example 1, whereby 98 grams (0.245 mol.) of ethylene glycol di-(4-choloro-phenoxy-acetate) was obtained. This product is a white crystalline material, melting at 88° C. and having the formula

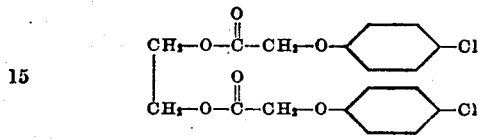

*Example 3*

In a similar manner 128 grams (0.5 mol.) of 2,4,5-trichloro-phenoxy-acetic acid was reacted with 21.5 grams (0.35 mol.) of ethylene glycol at a temperature of approximately 140° C. for 2½ hours to obtain 73 grams (0.136 mol. of ethylene glycol di-(2,4,5-trichloro-phenoxy-acetate) as a white crystalline powder, melting at 140° C. and having the formula

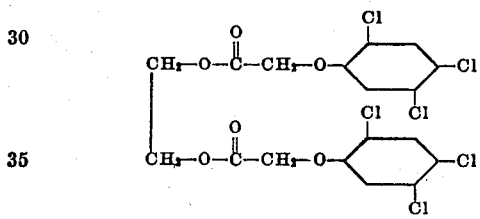

*Example 4*

A mixture of 104 grams (0.45 mol. of 2-bromo-phenoxy-acetic acid, melting point 144° C., 16 grams (0.26 mol.) of ethylene glycol, and 1 gram of benzene sulphonic acid was heated for two hours at temperatures ranging between 140° and 155° C., after which the reaction product was isolated in a manner similar to that described in Example 1. There was obtained 83 grams (0.17 mol.) of ethylene glycol di-(2-bromo-phenoxy-acetate) having a melting point of 121° C. and the formula

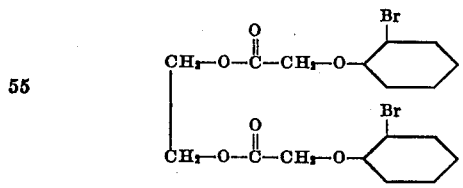

*Example 5*

201 grams (1 mol.) of 2-chloro-4-methyl-phenoxy-acetic acid, 32 grams (0.515 mol.) of ethylene glycol, and 2 grams of benzene sulphonic acid were reacted together over a period of 7 hours at temperatures ranging between 140° and 150° C. At the end of this time the reaction product was treated as described in Example 1, to obtain 70 grams (0.164 mol.) of ethylene glycol di-(2-chloro-4-methyl-phenoxy-acetate) as a white crystalline product having a melting point of 74° C. and the formula

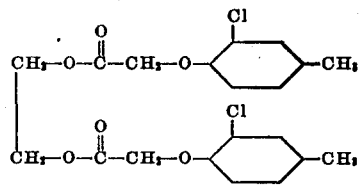

In accordance with the above-described procedures, other ethylene glycol di-(halo-aryloxy-acetates) may be prepared, wherein the substituting halogen is iodine, or in which substituting bromine and chlorine groups are arranged on the benzene nucleus in positions other than those suggested by the above examples, e. g. ethylene glycol di-(4-iodo-phenoxy-acetate), ethylene glycol di-(4-bromo-phenoxy-acetate), ethylene glycol di-(3-chloro-phenoxy-acetate), ethylene glycol di-(2,4-di-bromo-phenoxy-acetate), ethylene glycol di-(2,4,6-trichloro-phenoxy-acetate), etc. In a similar manner halo-aryloxy-acetates containing various alkyl substituents in the benzene ring may also be prepared, e. g. ethylene glycol di-(2-chloro-4-tertiary-butyl-phenoxy-acetate), etc.

This application is a continuation-in-part of our prior application Serial Number 47,406, filed October 30, 1935.

Other modes of applying the principle of our invention may be employed instead of those explained, change being made as regards the method or compounds herein disclosed, provided the compounds stated by any of the following claims be obtained.

We therefore particularly point out and distinctly claim as our invention:

1. A compound having the general formula

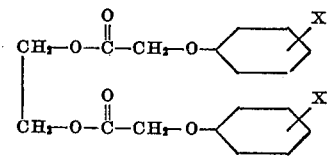

wherein X represents halogen.

2. A compound having the general formula

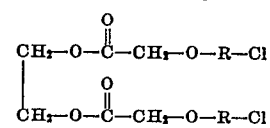

wherein R represents an aromatic group of the benzene series.

3. Ethylene glycol di-(2-chloro-4-methyl-phenoxy-acetate).

4. A compound having the general formula

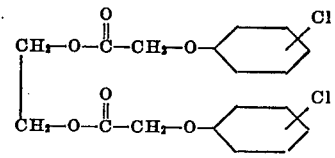

5. Ethylene glycol di-(2-chloro-phenoxy-acetate).

6. Ethylene glycol di-(4-chloro-phenoxy-acetate).

ERNEST F. GRETHER.
WILLIAM R. SHAWVER.
RUSSELL B. DU VALL.